(12) United States Patent
Van Der Velde et al.

(10) Patent No.: US 10,742,335 B2
(45) Date of Patent: Aug. 11, 2020

(54) RELATING TO INTERWORKING BETWEEN CELLULAR AND WLAN NETWORKS

(71) Applicant: Samsung Electronics Co., Ltd., Suwon-si, Gyeonggi-do (KR)

(72) Inventors: Himke Van Der Velde, Zwolle (NL); Gert-Jan Van Lieshout, Apeldoorn (NL); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/594,423

(22) Filed: May 12, 2017

(65) Prior Publication Data

US 2017/0331569 A1  Nov. 16, 2017

(30) Foreign Application Priority Data

May 13, 2016 (GB) .................................. 1608495

(51) Int. Cl.
*H04W 36/14* (2009.01)
*H04B 17/382* (2015.01)
*H04W 84/04* (2009.01)
*H04W 84/12* (2009.01)
*H04W 88/06* (2009.01)
*H04W 88/12* (2009.01)

(52) U.S. Cl.
CPC .......... *H04B 17/382* (2015.01); *H04W 36/14* (2013.01); *H04W 84/042* (2013.01); *H04W 84/12* (2013.01); *H04W 88/06* (2013.01); *H04W 88/12* (2013.01)

(58) Field of Classification Search
CPC .............................. H04W 36/14; H04B 17/382
USPC ................................................ 455/424, 456.1
See application file for complete search history.

(56) References Cited

U.S. PATENT DOCUMENTS

| | | | |
|---|---|---|---|
| 2015/0029879 A1* | 1/2015 | Chou | H04W 4/70 370/252 |
| 2015/0043373 A1* | 2/2015 | Wu | H04W 48/16 370/252 |
| 2015/0092553 A1* | 4/2015 | Sirotkin | H04W 48/16 370/235 |

FOREIGN PATENT DOCUMENTS

WO    2014170541 A1    10/2014

OTHER PUBLICATIONS

Combined Search and Examination Report under Sections 17 & 18(3) dated Jun. 9, 2017 in connection with United Kingdom Patent Application No. GB1608495.6, 8 pages.

(Continued)

*Primary Examiner* — Chuck Huynh (57) ABSTRACT

A method of operating a mobile terminal in a mobile communications network comprising a core network and a base station, wherein the mobile terminal is capable of transmitting data to and receiving data from the core network via the mobile base station or via a WLAN includes in the event that the WLAN becomes unavailable, reporting the WLAN unavailability to the mobile communications network, and detecting the WLAN becoming available again, and notifying the mobile communications network. A mobile terminal includes a transceiver configured to transmit data to and receive data from the core network via the mobile base station or via a WLAN, a controller configured to in the event that the WLAN becomes unavailable, report the WLAN unavailability to the mobile communications network via the transceiver, and detect the WLAN becoming available again, and notify the mobile communications network.

4 Claims, 8 Drawing Sheets

(56) References Cited

OTHER PUBLICATIONS

LG Electronics Inc., "Further enhancements of WLAN connection status report", 3GPP TSG-RAN WG2 #93bis, Apr. 11-15, 2016, 3 pages, R2-162935.
Intel Corporation, "Suspend/resume functionality for LWA", 3GPP TSG-RAN2 Meeting #93bis, Apr. 11-15, 2016, 3 pages, R2-162459.
TCL Communication, Sprint, "Coverage extension for LWA and LWIP features", 3GPP TSG-RAN WG2 Meeting #93BIS, Apr. 11-15, 2016, 4 pages, R2-162595.

* cited by examiner

RELATING TO INTERWORKING BETWEEN CELLULAR AND WLAN NETWORKS

CROSS-REFERENCE TO RELATED APPLICATION(S) AND CLAIM OF PRIORITY

The present application is related to and claims the benefit under 35 U.S.C. § 119(a) of a British patent application filed in the United Kingdom Intellectual Property Office on May 13, 2016 and assigned Ser. No. 1608495.6, the entire disclosure of which is hereby incorporated by reference.

TECHNICAL FIELD

The present disclosure relates to improvements in interworking between cellular networks and Wireless Local Area Networks (WLAN) via Wi-Fi®. The rapid adoption in recent times of mobile devices has led to a large increase in customer demand for data access via mobile networks. Often, this increase cannot be accommodated via cellular networks and so data offloading is performed, whereby the user's requested data is supplied via an associated WLAN.

BACKGROUND

Wireless or mobile (cellular) communications networks in which a mobile terminal (UE, such as a mobile handset) communicates via a radio link to a network of base stations or other wireless access points connected to a telecommunications network, have undergone rapid development through a number of generations. The initial deployment of systems using analogue signaling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardize technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular on standard for the Evolved Packet Core and the enhanced radio access network called "E-UTRAN". The E-UTRAN uses the Long Term Evolution (LTE) radio technology, which offers potentially greater capacity and additional features compared with previous standards. Despite LTE strictly referring only to the air interface, LTE is commonly used to refer to the whole system including evolved packet core (EPC) and E-UTRAN. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

SUMMARY

To address the above-discussed deficiencies, it is a primary object to provide embodiments of the present disclosure which may be implemented within an LTE mobile network (though the present disclosure may be considered to be applicable to many types of wireless communication network).

A method of operating a mobile terminal in a mobile communications network comprising a core network and a base station, wherein the mobile terminal is capable of transmitting data to and receiving data from the core network via the mobile base station or via a wireless local area network (WLAN) includes in the event that the WLAN becomes unavailable, reporting, by the mobile terminal, the WLAN unavailability to the mobile communications network, and detecting, by the mobile terminal, the WLAN becoming available again, and notifying the mobile communications network.

A mobile terminal operable with a mobile communications network comprising a core network and a mobile base station includes a transceiver configured to transmit data to and receive data from the core network via the mobile base station or via a WLAN, a controller configured to in the event that the WLAN becomes unavailable, report the WLAN unavailability to the mobile communications network via the transceiver, and detect the WLAN becoming available again, and notify the mobile communications network.

A method of operating a base station in a mobile communications network comprising a core network and a mobile terminal, wherein the mobile terminal is capable of transmitting data to and receiving data from the core network via the mobile base station or via a wireless local area network (WLAN) includes in the event that the WLAN becomes unavailable, receiving a report regarding the WLAN unavailability from the mobile terminal, and receiving a notification when the mobile terminal detects the WLAN becoming available again.

A base station operable with a mobile communications network comprising a core network and a mobile base station includes a transceiver configured to transmit data to and receive data from the mobile terminal via a core network or via a wireless local area network (WLAN), a controller configured to in the event that the WLAN becomes unavailable, receive a report the WLAN unavailability from the mobile terminal via the transceiver, and receive a notification from the mobile terminal when the mobile terminal detects the WLAN becoming available again.

Embodiments of the present disclosure aim to address problems and shortcomings with the prior art, whether mentioned herein or not.

According to the present disclosure there is provided an apparatus and method as set forth in the appended claims. Other features of the disclosure will be apparent from the dependent claims, and the description which follows.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 schematically illustrates an overview of an LTE mobile communication network;

FIG. 2 schematically illustrates an architecture of a WLAN-LTE interworking enhancement to an LTE network;

FIG. 3 shows message exchanges according to the 3GPP system;

FIG. 5 shows message exchanges in accordance with a second embodiment of the present disclosure;

FIG. 6 shows message exchanges in accordance with a third embodiment of the present disclosure;

FIG. 7 schematically illustrates the structure of a UE in accordance with embodiments of the present disclosure; and FIG. 8 schematically illustrates the structure of an eNB in accordance with embodiments of the present disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

In cases where offloading is performed from the cellular/core network to WLAN, there is a problem that if the WLAN is unavailable and then re-available through user action, the cellular network (EUTRAN) is not informed of this and so a possible valuable resource is not available. Note that throughout this application, the term 'offloading' is intended to cover several possible scenarios where data traffic is routed via an associated WLAN. Such scenarios include LTE-WLAN Aggregation (LWA), RAN Controlled LTE-WLAN Interworking (RCLWI), and LTE/WLAN Radio Level Integration with IPsec Tunnel (LWIP), at least, as known to the skilled person.

Embodiments of the present disclosure therefore seek to ensure that in cases such as this, the cellular network is kept properly informed of the status and/or availability of the WLAN facility so that data throughput can be maximized or optimized.

Presently, the cellular network is not able to do anything except regularly try to see if the failure persists. This is wasteful of resources and not an attractive option. If the UE does not report changes in the user preference for WLAN, then there is no benefit in transferring this information from source to target eNB on handover.

Therefore, an overview of an LTE network is shown in FIG. 1. The LTE system comprises three high level components: at least one user equipment (UE) 102, the E-UTRAN 104 and the EPC 106. The EPC 106, or core network as it may also be known, communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signaling is represented by dashed lines.

The E-UTRAN 104, or radio access network (RAN) as it may also be known, comprises a single type of component: an eNB (E-UTRAN Node B) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time, where an eNB may also be referred to as a mobile base station.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signaling messages exchanged with the UE 102 through the E-UTRAN 104. Each UE is registered with a single MME. There is no direct signaling pathway between the MME 114 and the UE 102 (communication with the UE 102 being across the air interface via the E-UTRAN 104). Signaling messages between the MME 114 and the UE 102 comprise EPS Session Management (ESM) protocol messages controlling the flow of data from the UE to the outside world and EPS Mobility Management (EMM) protocol messages controlling the rerouting of signaling and data flows when the UE 102 moves between eNBs within the E-UTRAN. The MME 114 exchanges signaling traffic with the S-GW 110 to assist with routing data traffic. The MME 114 also communicates with a Home Subscriber Server (HSS) 116 which stores information about users registered with the network.

An increase in consumer demand for wireless broadband data is evident from the fast uptake of LTE across the world. In view of this, and in view of the relatively high cost associated with increasing the capacity of LTE networks, data service suppliers and operators are increasingly studying how to augment those existing LTE networks. One such method involves using alternative wireless networks to compliment the broadband data services provided via LTE. Here, the operators would be able to offload traffic from the LTE wireless network to an alternative wireless networks, such as WLANs which operate in accordance with the Institute of Electrical and Electronic Engineers (IEEE) 802.11* standards, where this FIG. 2 provides a schematic illustration of the architecture for the interworking WLAN-LTE enhancement. The LTE network components correspond to those of FIG. 1, however, a WLAN 200 is integrated with the LTE architecture and is directly connected to the core network (S/P-GW) such that UE mobility between LTE and WLAN is network controlled by, for example, the serving eNB 202 as opposed to the UE as specified in 3GPP Release 12. Data packets may be communicated between the UE and the core network either via the eNB and the conventional LTE air interface or alternatively may be communicated via the WLAN to the core network.

In the architecture of FIG. 2, data which would conventionally be communicated via the LTE interface may be offloaded to the WLAN, which among other benefits, may free up resources in the LTE air interface and also potentially provide enhanced data rates to the UE. In this architecture, the mobility of the UE between LTE and the WLAN is network controlled, for example the eNB may issue commands to transfer/offload data traffic from LTE to WLAN. To achieve this, the UE may report a number of measurements to the eNB, such as WLAN RSSI, WLAN cell availability, WLAN backhaul rate, WLAN channel utilization etc. Based on these measurements, the eNB may then, for instance, command the UE to move the traffic of certain bearers to the WLAN or back to LTE from the WLAN. It will be appreciated that because traffic sent to/from the core network via WLAN bypasses the eNB, though the eNB may be aware of some WLAN characteristics by virtue of the UE measurement reports, the eNB may not be directly aware of the amount of traffic that is transported over WLAN. However, FIG. 2 also shows a direct connection between the WLAN and the eNB 202, and systems may, alternatively, be constructed where data which has been offloaded traverses the eNB.

Managing the interworking between the cellular/core network and the WLAN can be problematic. Typically, the cellular network is very widespread and nearly universally available. However, each user may have access to one or more different WLANs, perhaps at home, at their office, at their favorite coffee shop, on a train and so on. User preference may make the WLAN unavailable and it may not be possible for the network to know this, which further hampers managing the interworking between the two networks.

The 3GPP standard explicitly foresees and allows for interworking between the cellular and WLAN networks, but there are problems associated with this interworking.

In conventional 3GPP systems, after a WLAN has been configured, the User Equipment (UE) may report one of four possible outcomes: •success (i.e. the UE has successfully associated with one of the WLANs included in the so-called mobility set; •timeout (i.e. during a predefined period, the UE did not successfully associate with one of the WLANs included in the mobility set); •user preference (i.e. after successful association, the connection to the WLAN was lost because the user chose to use the WLAN hardware for another purpose); and •failure (i.e. after successful association, the connection was subsequently lost)

FIG. 3 demonstrates the problem when a UE 102 is in an offloading association with a WLAN, and the message exchanges with the network (EUTRAN 104). The messages in this transaction are labelled 1 to 5. Message 1: the network configures the UE to report WLAN measurements. Message 2: the UE triggers a measurement report when one or more WLANs included in the mobility set becomes suitable i.e. it meets certain predefined conditions, such as signal strength above a threshold (other conditions, such as Quality of Service (QoS) may apply, as required). Message 3: the network (EUTRAN) configures the UE to perform WLAN offloading. As part of this step, the UE may be configured to start a timer designated in the art as T351, upon WLAN configuration. Message 4: the UE reports successful association with a WLAN included in the mobility set, if it is configured to do so. Message 5: If the WLAN becomes unavailable, then the UE reports WLAN failure to the network. The UE may defer sending the failure message until the timer T351 has expired—this is implementation-dependent.

The problem, as mentioned previously, is that in this scenario, there is no efficient mechanism whereby the WLAN offloading may be resumed upon the WLAN becoming available again after failure has been reported to the network. The only means by which the network can check is to regularly attempt to configure WLAN offloading (as per Message 3, above). Essentially, there is no mechanism for the network to determine if the WLAN unavailability persists or if it is only temporary or transient.

In order to address this problem, embodiments of the present disclosure are operable to use one or more of three possible solutions. Each will be described below.

Figure 4:
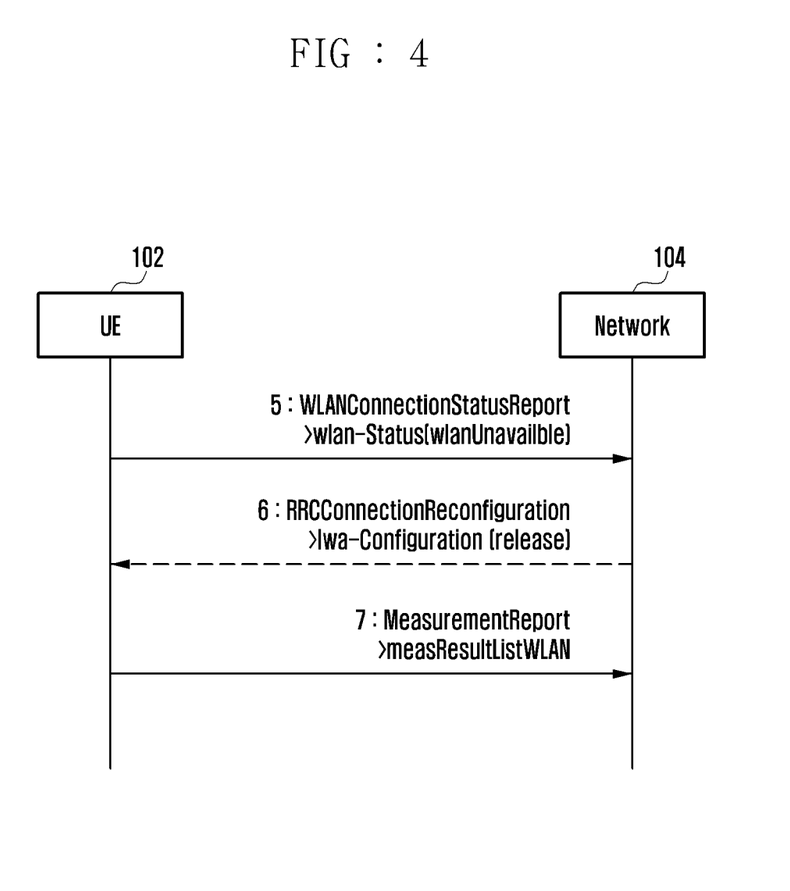
FIG. 4 shows message exchanges in accordance with a first embodiment of the present disclosure.

In a first embodiment, illustrated in FIG. 4, the UE 102 is operable to trigger a measurement report upon the WLAN becoming available, even if the measurement results are the same as those last reported (e.g. the same WLANs triggered the event conditions). In other words, the UE acts to reset the stored measurement report information (referred to in the applicable standard as VarMeasReportList), in particular the list of WLANs that triggered a measurement report. As a result of this approach, if the WLAN becomes available again, after becoming unavailable, the UE again reports any suitable WLAN it detects, including any WLANs which have been previously reported to the network 104.

In FIG. 4, there is illustrated message steps 5 through 7, which follow on from steps 1 through 4, shown in FIG. 3. The content of Message 5 is the same as the content of Message 5 in FIG. 3 in that the UE reports WLAN failure after the WLAN has become unavailable by user action and clear information it has previously stored about previous WLAN offload related measurements in the particular list of WLANs that triggered a report, but related actions differ. i.e. the aforementioned clearing of measurement information, which may be performed by removing all WLAN related measurement reporting entries within VarMeasReportList. This ensures that the UE always reports when a WLAN becomes available again after previously being unavailable. Message 6: the network (EUTRAN) may release the WLAN offloading configuration so that the UE does not perform WLAN offloading any more. Message 7: the UE triggers a measurement report when one or more WLANs included in the mobility set become suitable, i.e. one or more threshold conditions is met (similar to Message 2 in FIG. 3).

In response to receiving an indication that the WLAN has become available, in this and the following embodiments, the E-UTRAN may re-configure WLAN offload. This ensures that the UE behaves in the same way as upon initial configuration of WLAN offload i.e. the UE reports either a) a report of successful association, b) a report of failure, or c) a sequence of a) and b).

In a second embodiment, the UE is operable to report, to the network, successful association following the reporting of WLAN failure. This is illustrated in FIG. 5, which follow on from Messages 1 through 4 of FIG. 3. At Message 5, the UE reports WLAN failure, after the WLAN becomes unavailable due to user action.

Message 6: UE reports successful association with a WLAN included in the mobility set if the UE is configured to report such a successful association.

A benefit of this particular embodiment is that it requires relatively small amendments to applicable standard specification. For instance, this may involve adding a statement that the UE triggers WLAN connection status report upon successful association with a WLAN included in the mobility set, following reporting WLAN unavailability.

This embodiment only functions if EUTRAN does not release the WLAN configuration upon receiving a report of WLAN unavailability. In the case of WLAN unavailability, however, there is no requirement for the EUTRAN to release WLAN configuration as the UE does not take any battery-consuming action.

In a third embodiment, illustrated in FIG. 6, the UE is operable to report WLAN availability after a period of unavailability, by introducing a trigger condition. Message steps 1 to 4 are as shown in FIG. 3. Message 5: UE is operable to report WLAN failure after the WLAN has become unavailable due to user action. Message 6: the UE triggers a WLAN connection status report, upon the WLAN becoming available. If the UE does not trigger a measurement report, then the network/EUTRAN assumes that the measurement situation is the same as before the UE reported WLAN unavailability.

This embodiment requires more substantial variation of the standard specification. In particular, it requires a statement that the UE triggers a WLAN connection status report upon the WLAN becoming available following reporting of WLAN unavailability.

It also requires the addition of a statement that the UE triggers such a report only if it is (still) configured with measurement object for WLAN.

Furthermore, the UE may perform such reporting only if specifically configured to do so by EUTRAN, and the EUTRAN may furthermore configure the UE to perform such reporting only if the UE indicates support for this (UE capabilities).

It is also necessary to introduce a failure code point for WLAN available.

In a case where the UE provides a WLAN connection status report within 1 second before handover or re-establishment, the UE repeats the UE connection status report after handover. In other words, in case the UE triggers the indication that the WLAN became available shortly before handover or re-establishment, the source eNB may already have forwarded the status information to the target eNB. In such cases the target eNB would thus not be aware that the WLAN has become available again. To address this, the UE repeats the indication that WLAN has become available after handover/re-establishment. Typically this is done in case the indication was triggered within e.g. 1 second prior to handover or re-establishment. In the example given of the first embodiment, set out above, this also applies to the measurement report that would be used to indicate that the WLAN has become available.

FIG. 7 provides a schematic diagram of the structure of a UE 102 which is arranged to operate in accordance with the examples of the present disclosure described above. The UE includes a transmitter 1000 arranged to transmit user and control data to the eNB, such as measurement reports; a receiver 1002 arranged to receive user and control data from the eNB, such as WLAN/LTE reconfiguration messages and offload allowed commands; and a controller 1004 arranged to control the transmitter and receiver and to perform processing such as determining traffic to offload between LTE and the WLAN.

FIG. 8 provides a schematic diagram of the structure of an eNB 202 which is arranged to operate in accordance with the examples of the present disclosure described above. The eNB includes a transmitter 1100 arranged to transmit user and control data to the UE, such as WLAN/LTE reconfiguration messages and offload allowed commands; a receiver 1102 arranged to receive user and control data from the UE, such as measurement reports; and a controller 1104 arranged to control the transmitter and receiver and to perform processing such as determining WLAN/LTE configurations.

Although in FIGS. 7 and 8 the transmitter, receiver, and controller have been illustrated as separate elements, any single element or plurality of elements which provide equivalent functionality may be used to implement the examples of the present disclosure described above.

In all the embodiments set out above, the network is informed of the availability of a WLAN which has previously been unavailable. This is not possible in prior art systems, and embodiments of the present disclosure therefore improve the performance of offloading in the sense of cellular/WLAN interworking.

Although described chiefly in terms of specific cellular networks, the skilled person will appreciate that the embodiments described can be adapted for use in different cellular and WLAN environments without departing from the broad scope of disclosure defined by the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

The above embodiments can be implemented by utilizing any type and number of processors, such as a general processor, an Application-Specific Integrated Circuit (ASIC), or a Field-Programmable Gate Array (FPGA), and the like.

The above-described embodiments may be recorded in non-transitory computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for monitoring network status by a user equipment (UE), the method comprising:
    transmitting, to a cellular network, a connection status report indicating that a wireless local area network (WLAN) is unavailable, in case a connection to the WLAN included in a mobility set fails;
    removing, by the UE, measurement reporting entries associated with the WLAN within a list;
    transmitting, to the cellular network, a measurement report including measurement information associated with the WLAN, in case the WLAN becomes available after removing the measurement reporting entries associated with the WLAN; and
    transmitting, to the cellular network, a connection status report indicating that the WLAN is available, following reporting of WLAN unavailability, if the WLAN becomes available after removing the measurement reporting entries associated with the WLAN,
    wherein the connection status report indicating that the WLAN is available is transmitted only if the UE is configured with a measurement object for WLAN.

2. A method for receiving a network status by a cellular network, the method comprising:
    receiving, from a user equipment (UE), a connection status report indicating that a wireless local area network (WLAN) is unavailable, in case a connection to the WLAN included in a mobility set fails;
    transmitting, to the UE, a message associated with releasing offloading configuration for the WLAN;
    receiving, from the UE, a measurement report including measurement information associated with the WLAN, in case the WLAN becomes available after measurement reporting entries associated with the WLAN is removed by the UE within a list; and
    receiving, from the UE, a connection status report indicating that the WLAN is available, following reporting of WLAN unavailability, if the WLAN becomes available after the measurement reporting entries associated with the WLAN is removed,
    wherein the connection status report indicating that the WLAN is available is received only if the UE is configured with a measurement object for WLAN.

3. A user equipment (UE) for monitoring network status, the UE comprising:
    a transceiver; and
    a controller coupled with the transceiver and configured to control to:
        transmit, to a cellular network, a connection status report indicating that a wireless local area network (WLAN) is unavailable, in case a connection to the WLAN included in a mobility set fails,
        remove measurement reporting entries associated with the WLAN within a list,
        transmit, to the cellular network, a measurement report including measurement information associated with the WLAN, in case the WLAN becomes available after removing the measurement reporting entries associated with the WLAN; and
        transmit, to the cellular network, a connection status report indicating that the WLAN is available, following reporting of WLAN unavailability, if the WLAN becomes available after removing the measurement reporting entries associated with the WLAN,
    wherein the connection status report indicating that the WLAN is available is transmitted only if the UE is configured with a measurement object for WLAN.

4. A cellular network for receiving a network status, the cellular network comprising:
    a transceiver; and
    a controller coupled with the transceiver and configured to control to:
        receive, from a user equipment (UE), a connection status report indicating that a wireless local area network (WLAN) is unavailable, in case a connection to the WLAN included in a mobility set fails,
        transmit, to the UE, a message associated with releasing offloading configuration for the WLAN,
        receive, from the UE, a measurement report including measurement information associated with the WLAN, in case the WLAN becomes available after measurement reporting entries associated with the WLAN is removed by the UE within a list, and
        receive, from the UE, a connection status report indicating that the WLAN is available, following reporting of WLAN unavailability, if the WLAN becomes available after the measurement reporting entries associated with the WLAN is removed,
    wherein the connection status report indicating that the WLAN is available is received only if the UE is configured with a measurement object for WLAN.

* * * * *